(12) United States Patent
Sturgin (10) Patent No.: US 8,042,665 B2
(45) Date of Patent: Oct. 25, 2011

(54) MULTI FUNCTION TORQUE CONVERTER WITH LEVER SPRING AND METHOD FOR CONTROLLING HYDRAULIC PRESSURE AND FLOW

(75) Inventor: Todd J. Sturgin, Shreve, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 964 days.

(21) Appl. No.: 12/001,220

(22) Filed: Dec. 11, 2007

(65) Prior Publication Data

US 2008/0149441 A1  Jun. 26, 2008

Related U.S. Application Data

(60) Provisional application No. 60/876,652, filed on Dec. 22, 2006.

(51) Int. Cl.
*F16H 45/02* (2006.01)
*F16D 25/10* (2006.01)

(52) U.S. Cl. .......... 192/3.26; 192/3.3; 192/48.618; 192/85.35; 192/99 A (58) Field of Classification Search .......... 192/3.25, 192/3.26, 3.27, 48.603, 48.618
See application file for complete search history.

(56) References Cited

U.S. PATENT DOCUMENTS

| | | | | |
|---|---|---|---|---|
| 1,711,095 A | * | 4/1929 | Klimek | 192/3.28 |
| 2,135,282 A | * | 11/1938 | Fottinger | 60/341 |
| 2,142,199 A | * | 1/1939 | Lysholm et al. | 192/3.25 |
| 2,700,444 A | * | 1/1955 | Ahlen | 192/93 A |
| 2,707,539 A | * | 5/1955 | Marble | 192/3.26 |
| 2,749,710 A | * | 6/1956 | Russell | 60/345 |
| 3,398,603 A | | 8/1968 | Szodfridt et al. | |
| 3,625,323 A | * | 12/1971 | Hetmann | 192/3.26 |
| 3,820,417 A | | 6/1974 | Allen et al. | |
| 4,301,904 A | * | 11/1981 | Ahlen | 192/70.3 |
| 4,733,761 A | | 3/1988 | Sakakibara | |
| 5,695,028 A | | 12/1997 | Fukushima | |
| 6,325,190 B1 | | 12/2001 | Yoshimoto et al. | |
| 6,494,303 B1 | | 12/2002 | Reik et al. | |
| 6,814,194 B2 | | 11/2004 | Back et al. | |
| 6,881,171 B2 | | 4/2005 | Kuhstrebe et al. | |
| 2001/0020402 A1 | | 9/2001 | Shichinohe et al. | |
| 2004/0188208 A1 | | 9/2004 | Leber | |
| 2006/0086584 A1 | | 4/2006 | Maucher et al. | |

FOREIGN PATENT DOCUMENTS

| | | |
|---|---|---|
| DE | 4342439 | 6/1994 |
| JP | 02203078 A | 8/1990 |
| JP | 2005-036958 | 2/2005 |
| WO | WO 2004/003400 A1 | 1/2004 |

* cited by examiner

*Primary Examiner* — Rodney Bonck
(74) *Attorney, Agent, or Firm* — Simpson & Simpson, PLLC (57) ABSTRACT

A torque converter including an impeller clutch with a first portion connected to a cover for the torque converter and a second portion connected to an impeller; and a lever element in contact with the clutch and displaceable to multiply a first force applied to the lever element for operation of the clutch. In some aspects, the converter includes an impeller piston plate engaged with the lever element and displaceable to apply the force to the lever element. In some aspects, the torque converter includes a torus and a charge chamber for the impeller clutch, a second force is associated with a hydraulic pressure to prevent cavitation in the torus, a third force is required to operate the impeller clutch to transmit a desired torque across the impeller clutch, and the multiplied force is at least equal to a sum of the second force and a third forces.

15 Claims, 12 Drawing Sheets

MULTI FUNCTION TORQUE CONVERTER WITH LEVER SPRING AND METHOD FOR CONTROLLING HYDRAULIC PRESSURE AND FLOW

CROSS-REFERENCE TO RELATED APPLICATIONS

This application claims the benefit under 35 U.S.C. §119(e) of U.S. Provisional Application No. 60/876,652 filed on Dec. 22, 2006 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a multi function torque converter with a lever spring to increase the torque capacity of clutches in the torque converter.

BACKGROUND OF THE INVENTION

Figure 1:
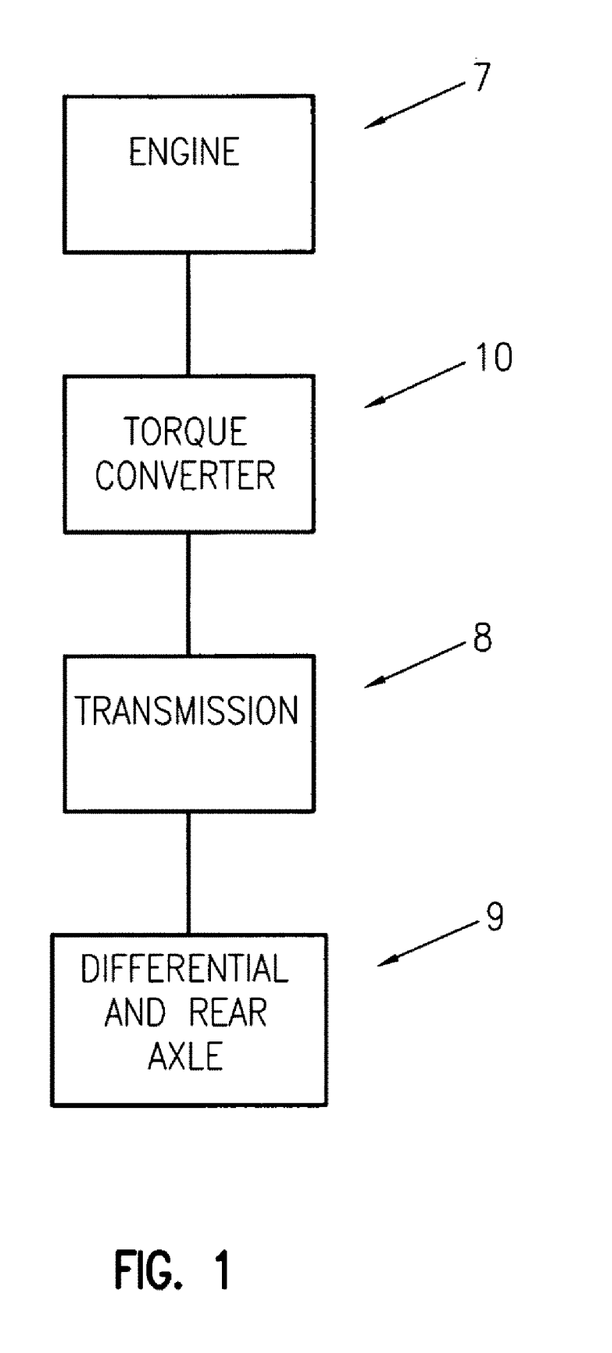
FIG. 1 is a general block diagram illustration of power flow in a motor vehicle, intended to help explain the relationship and function of a torque converter in the drive train thereof.

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

Figure 2:
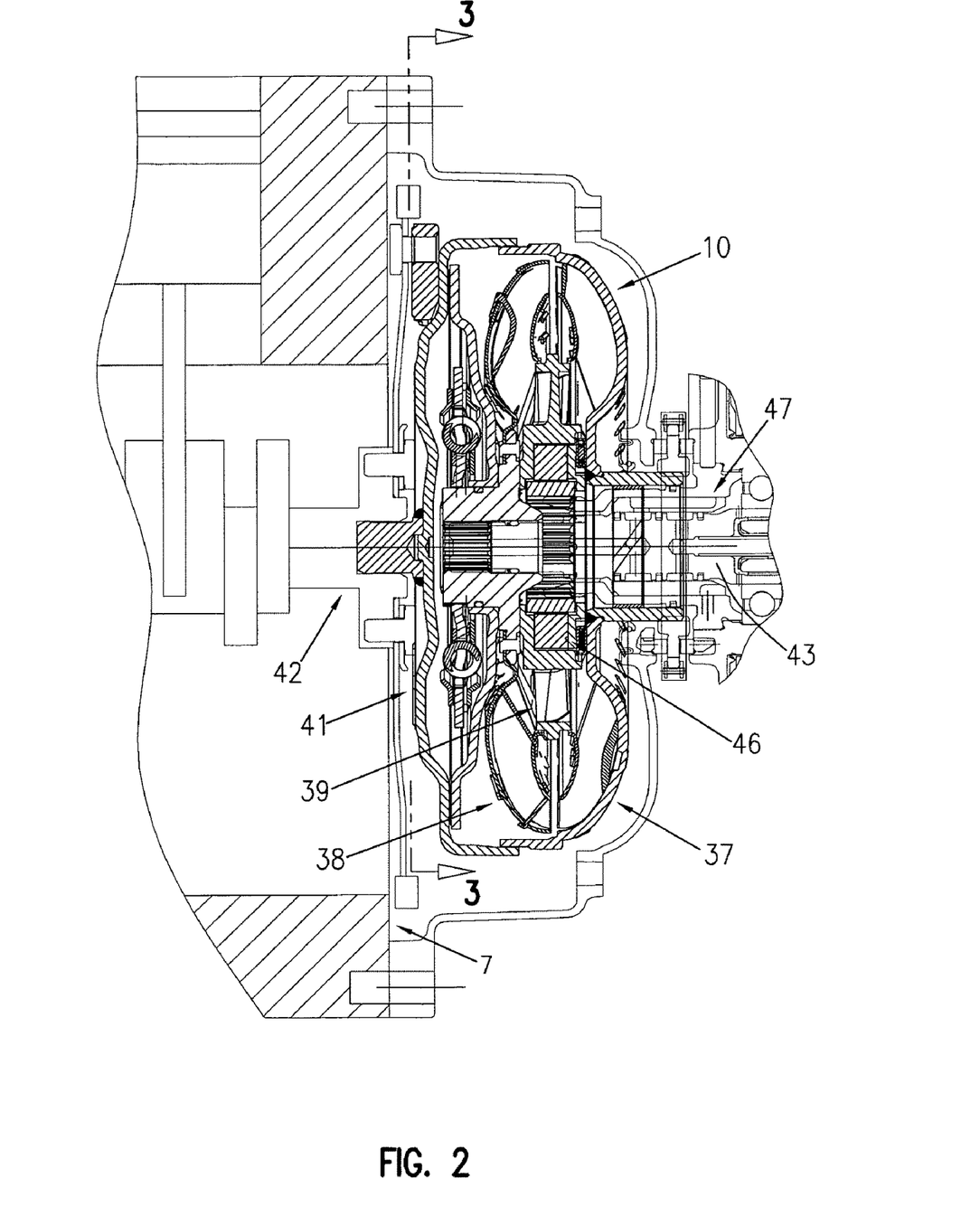
FIG. 2 is a cross-sectional view of a prior art torque converter, shown secured to an engine of a motor vehicle.
Figure 3:
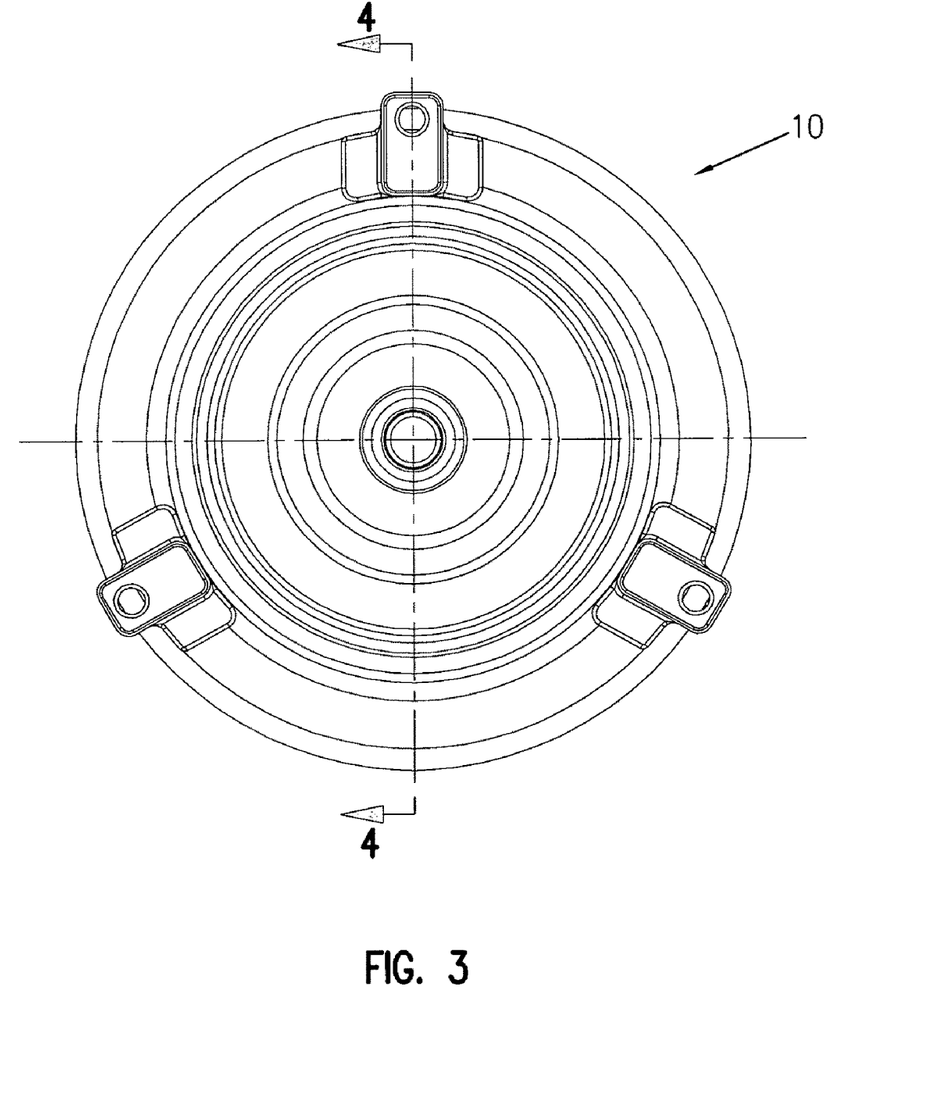
FIG. 3 is a left view of the torque converter shown in FIG. 2, taken generally along line 3-3 in FIG. 2.
Figure 4:
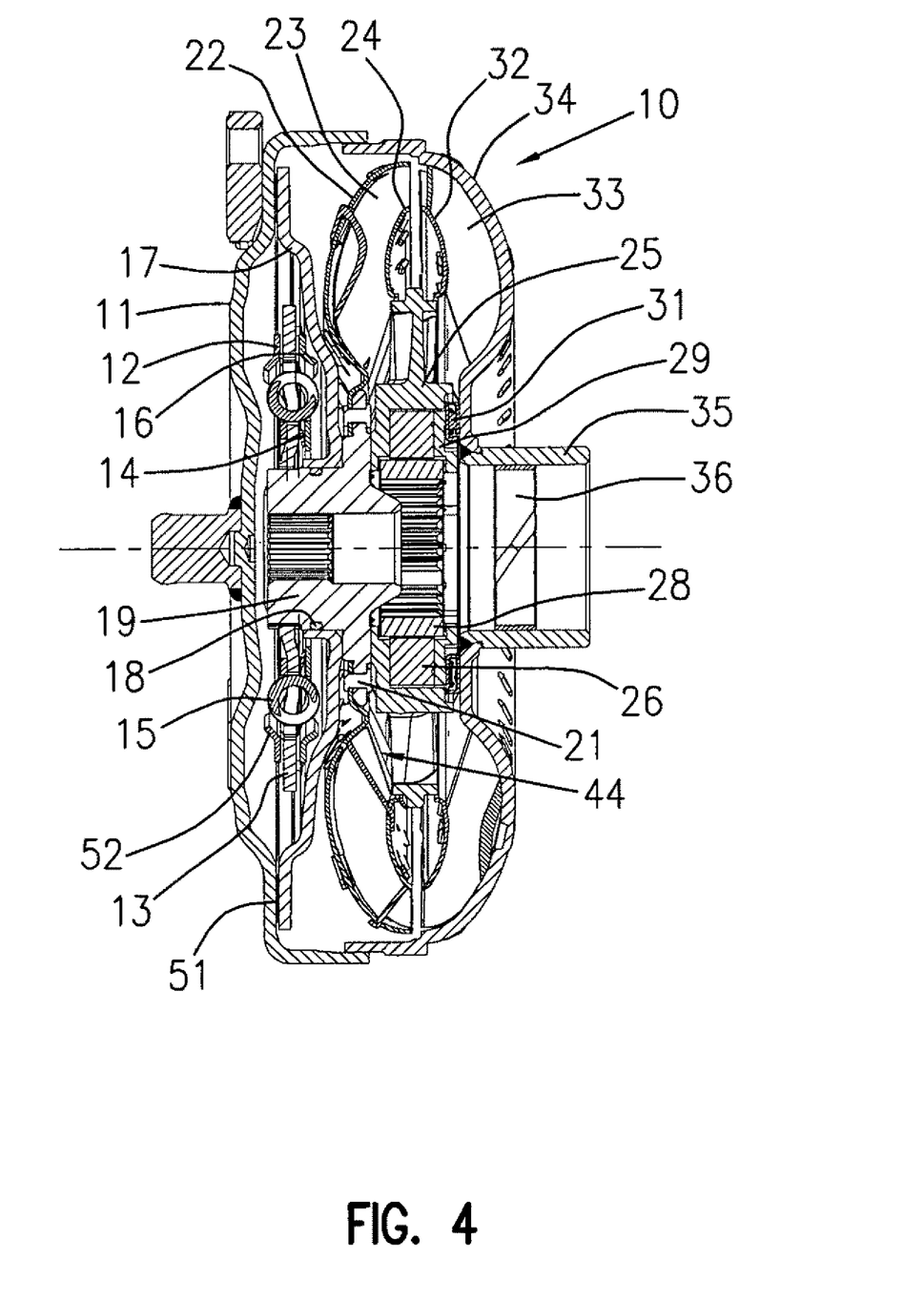
FIG. 4 is a cross-sectional view of the torque converter shown in FIGS. 2 and 3, taken generally along line 4-4 in FIG. 3.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Figure 5:
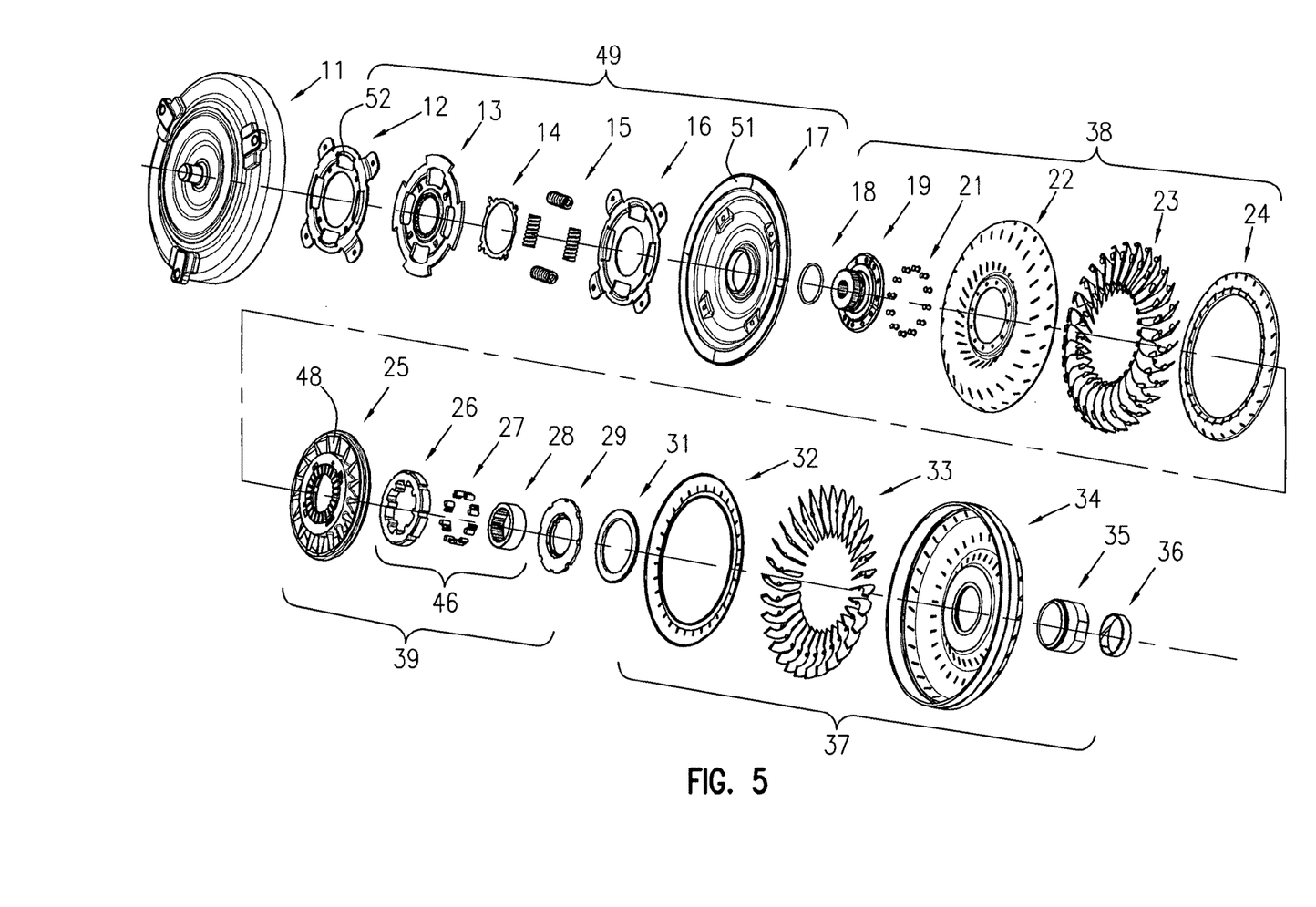
FIG. 5 is a first exploded view of the torque converter shown in FIG. 2, as shown from the perspective of one viewing the exploded torque converter from the left.
Figure 6:
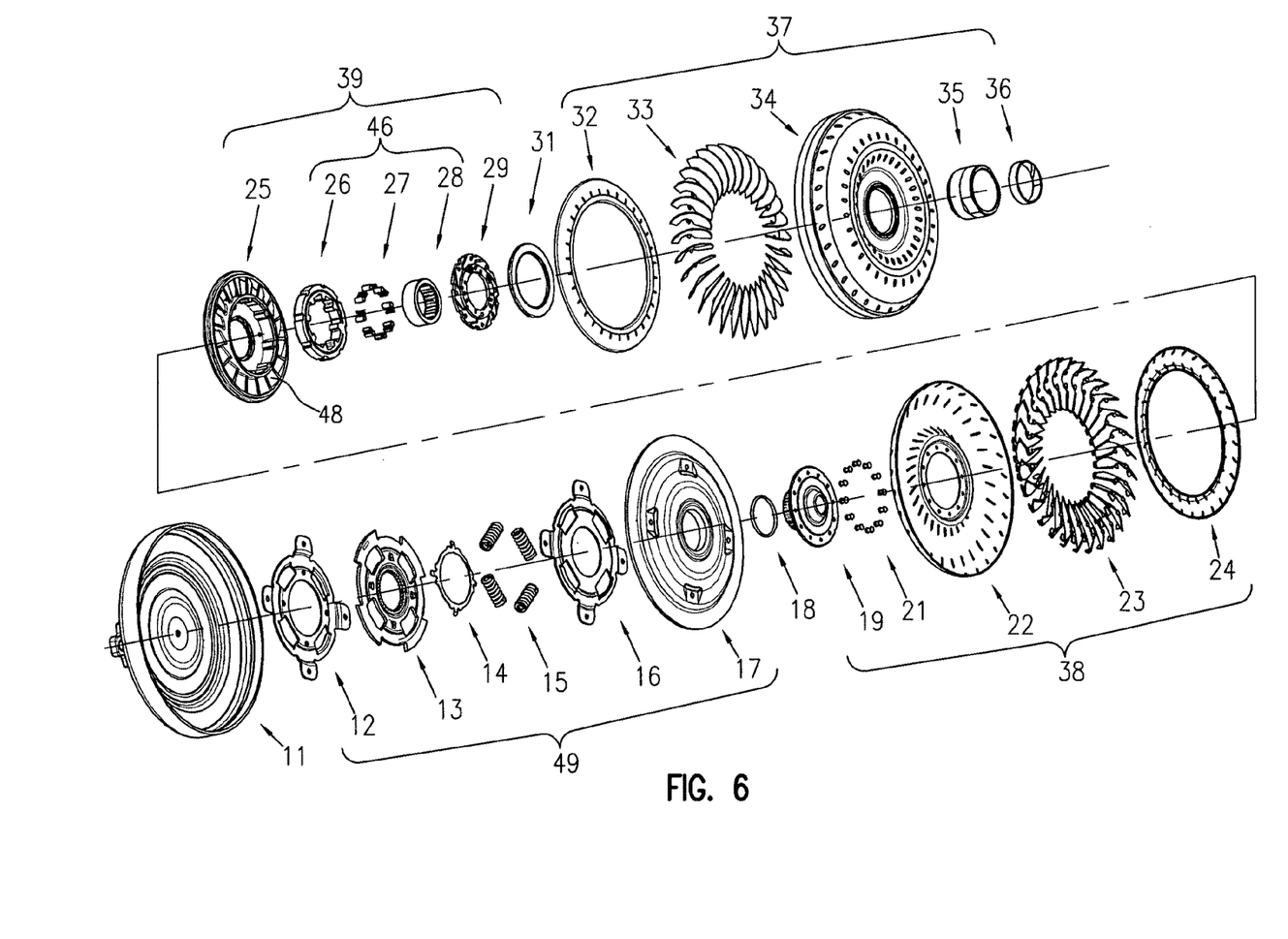
FIG. 6 is a second exploded view of the torque converter shown in FIG. 2, as shown from the perspective of one viewing the exploded torque converter from the right.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

For torque converters with some clutch configurations, oil flows through the torus, absorbs heat to cool the torus, and passes through openings in the friction material for the impeller clutch. Unfortunately, the heated oil can undesirably raise the temperature of the friction material. Further, for torque converters with some clutch configurations, the torus is typically in fluid communication with the release pressure chamber for the clutch. Unfortunately, the torus and the release chamber have conflicting requirements. It is desirable to maintain high pressure in the torus to prevent cavitation and to enable proper cooling flow, while at the same time, it is desirable to maintain pressure as low as possible in the release chamber to minimize the pressure needed to engage the clutch.

Therefore, there is a long-felt need in a torque converter to avoid adding heat to friction material through oil flow and to resolve the conflicting requirements for pressure in a clutch release chamber and the torus.

BRIEF SUMMARY OF THE INVENTION

The present invention broadly comprises a torque converter including an impeller clutch with a first portion connected to a cover for the torque converter and a second portion connected to an impeller; and a lever element in contact with the impeller clutch and displaceable to multiply a first force applied to the lever element for operation of the impeller clutch. In some aspects, the torque converter includes an impeller piston plate engaged with the lever element and displaceable to apply the force to the lever element. In some aspects, the torque converter includes an apply plate engaged with the impeller piston plate and connected to the lever element.

In some aspects, the torque converter includes a torus and a charge chamber for the impeller clutch, a second force is associated with a hydraulic pressure to prevent cavitation in the torus, a third force is required to operate the impeller clutch to transmit a desired torque across the impeller clutch, and the multiplied force is at least equal to a sum of the second force and a third forces.

In some aspects, the impeller piston plate and the lever element are independently rotatable. In some aspects, the impeller piston plate is rotationally connected to the cover and the lever element is rotationally connected to the impeller. In some aspects, the impeller clutch further comprises an impeller plate and a fixed plate. The impeller plate is axially displaceable, the fixed plate is fixed to the impeller, one end of the lever element is pivotably connected to the fixed plate, and the lever element is in contact with the impeller plate. The impeller plate is arranged to close the impeller clutch in response to the displacement of the lever element.

In some aspects, the torque converter includes an output hub and a torque converter clutch and the torque converter clutch includes the fixed plate and a piston plate connected to the output hub. In some aspects, the torque converter includes a damper assembly rotationally connected to the cover and to the impeller clutch.

The present invention also broadly comprises a torque converter including a clutch connected to first and second torque transmitting elements for the torque converter and a lever element in contact with the clutch and displaceable to multiply a force applied to the lever element and to transmit the multiplied force to the clutch. The torque converter also includes a piston plate engaged with the lever element and displaceable to apply the force to the lever element. The torque converter includes an axially fixed plate, and the other end of the lever element is pivotably attached to the fixed plate.

The present invention also broadly comprises a method of operating a torque converter including the steps of maintaining pressure for fluid in a second chamber greater than pressure for fluid in a first chamber, the first chamber including a torus; multiplying a clutch apply force using mechanical advantage associated with a lever; maintaining pressure for fluid in a third chamber greater than the pressure for fluid in the second chamber; closing, in response to multiplying the clutch apply force and maintaining pressure for fluid in a third chamber greater than the pressure for fluid in the second chamber, a torque transmission path between the cover and an impeller; and flowing the fluid from the second chamber to the first chamber to cool the torus. In some aspects, the method includes opening, in response to maintaining pressure for fluid in a second chamber greater than pressure for fluid in a first chamber, a mechanical torque transmission path between a cover for the torque converter and an output hub. The torque path between the cover and the impeller includes friction material and the method bypasses the friction material with the flow between the second and first chambers.

It is a general object of the present invention to provide a torque converter with an impeller clutch utilizing mechanical advantage to augment hydraulic force for actuating the clutch.

It is another general object of the present invention to provide a torque converter with a torus cooling flow that bypasses frictional material for an impeller clutch.

It is yet another general object of the present invention to provide a torque converter that reconciles the pressure requirements of the impeller clutch release chamber and the torus.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
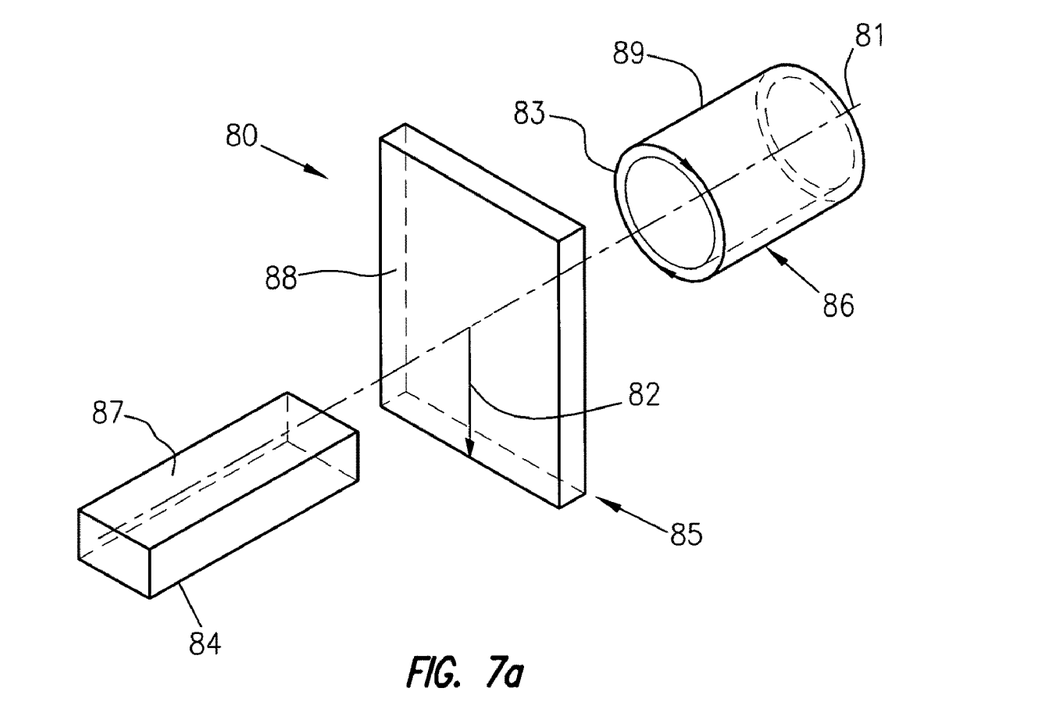
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
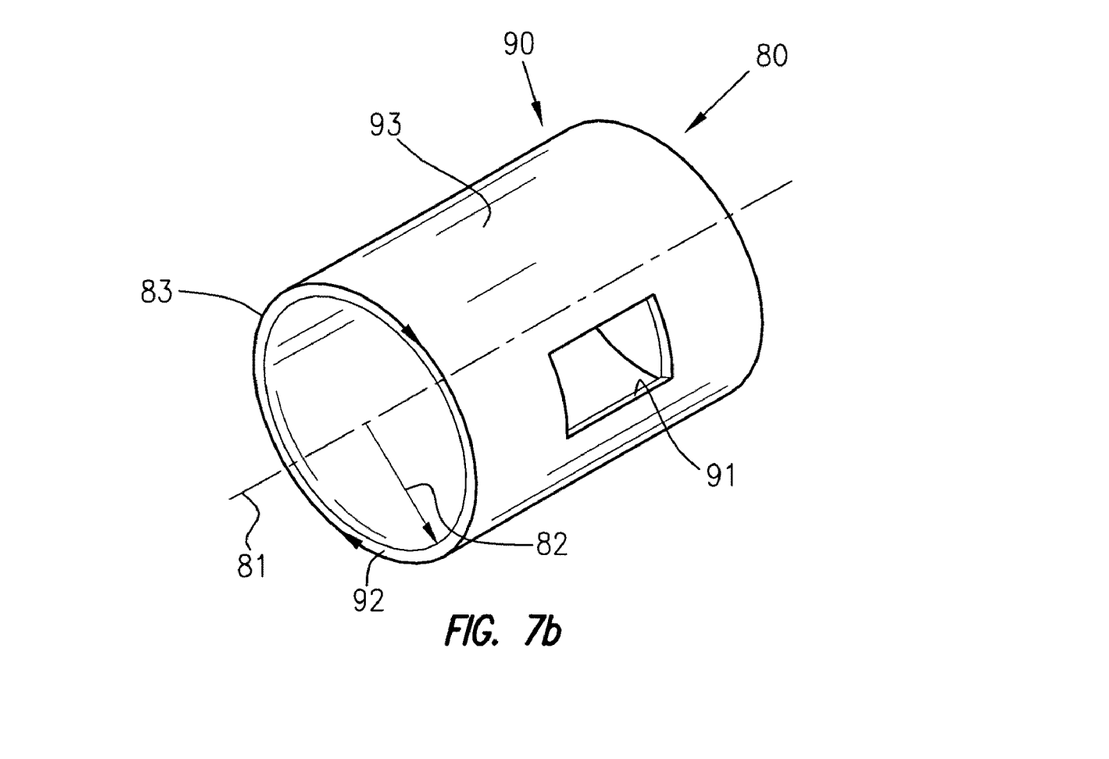
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 8:
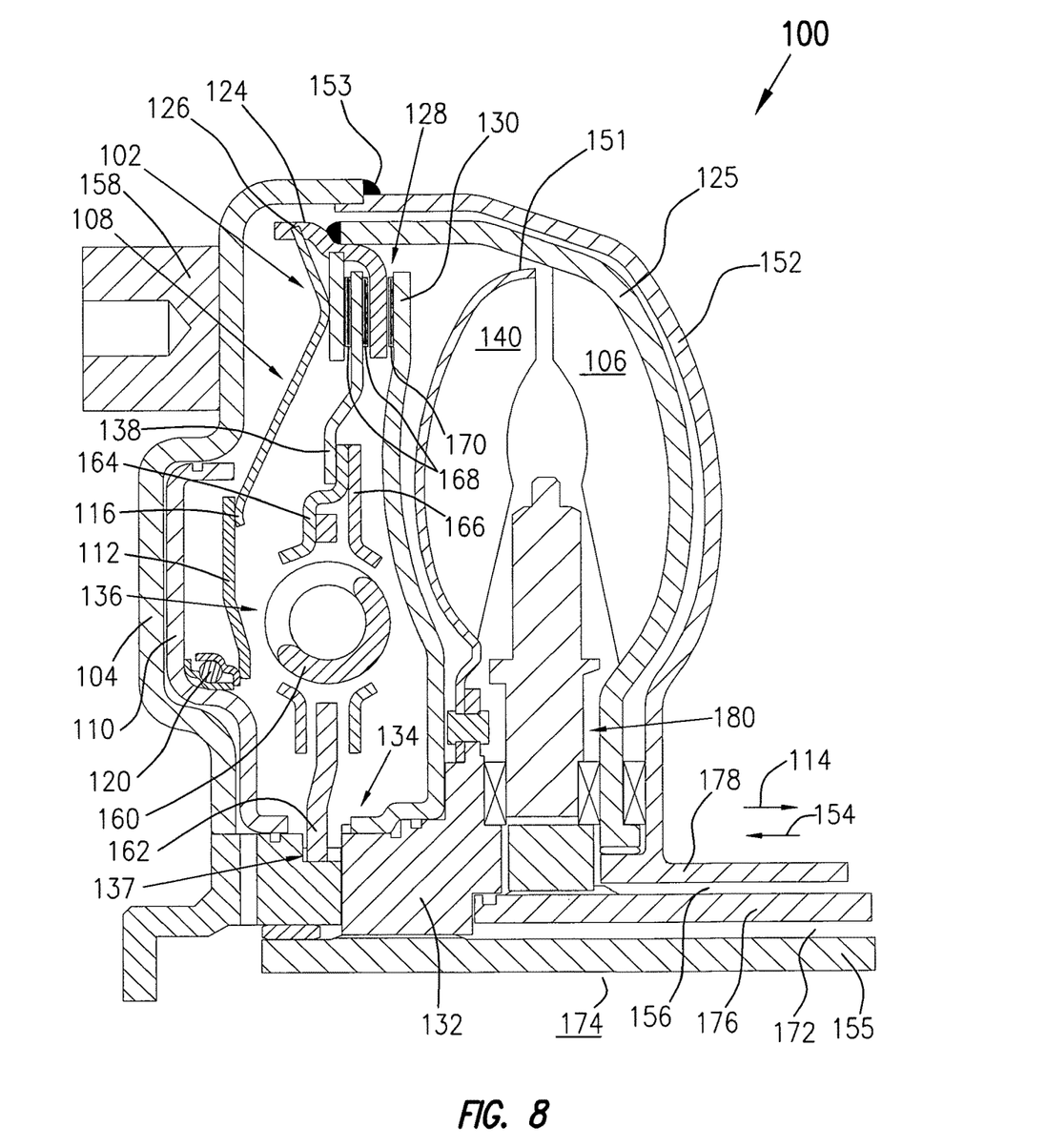
FIG. 8 is a partial cross-sectional view of a present invention torque converter.

FIG. 8 is a partial cross-sectional view of present invention torque converter 100. Torque converter 100 includes impeller clutch 102 connected cover 104 and impeller 106. Converter 100 also includes lever element 108 in contact with clutch 102 and displaceable to multiply a force applied to the lever element and to transmit the multiplied force to the impeller clutch as further described infra. That is, the lever element is in contact with the impeller clutch and is displaceable to multiply a force applied to the lever element for operation of the impeller clutch. A piston plate is used to apply the force to the lever element, for example, plate 110. The piston plate is engaged, or connected, with element 108. In some aspects, the plate is axially engaged with element 108. By axially engaged or connected, we mean that two components are interfaced such that the two components axially displace together in at least one direction. Axially engaging two components does not necessarily limit relative movement in other directions. For example, it is possible for two components that are axially engaged to rotate independently. However, it should be understood that axially engagement does not imply that movement in other directions is necessarily present. The preceding explanation of axial engagement is applicable to the discussions infra.

In some aspects (not shown), plate 110 is directly engaged with the lever element. In some aspects, apply plate 112 is engaged with the impeller piston plate and connected to the lever element. In some aspects, the plate is axially engaged with element 108. In some aspects, plate 112 and element 108 are fixedly connected by any means known in the art, for example, welding.

Element 108 is in contact with the impeller clutch and is displaceable to multiply a force applied to plate 110 and to apply the multiplied force to the impeller clutch. The multiplied force then closes the impeller clutch so that the clutch transmits a specified, or desired, torque from the cover to the impeller, for example, as required for a torque converter mode. Specifically, the force applied to plate 110 displaces plate 110 in direction 114. Plate 110 in turn displaces end 116 of element 108, through plate 112, in direction 114 and the mechanical advantage described infra causes element 108 to multiply the force and apply the force to clutch 102. In some aspects, element 108 is a resilient element, for example, a spring, specifically a diaphragm spring.

Plate 110 is connected to plate 112 by any means known in the art to enable the transmission of force from plate 110 to the apply plate. In some aspects, the two plates are connected by release bearing 120. Bearing 120 enables plates 110 and 112 to be independently rotatable. In general, plate 110 rotates with the cover and plate 112 is rotationally connected to the impeller. By rotationally connected, or secured, we mean that two components are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra.

Clutch 102 includes impeller plate 122 and fixed plate 124. Plate 122 is displaceable, for example axially displaceable, and fixed plate 124 is fixed at least axially to impeller shell 125. End 126 of the lever element is pivotably connected to the fixed plate, and the lever element is in contact with the impeller plate. The impeller plate is arranged to close the impeller clutch in response to the displacement of the lever element. Element 108 pivots about the connection at end 126 in response to the axial displacement of end 116, and the mechanical advantage of the pivoting connection results in a multiplication of the force applied to end 116.

In some aspects, torque converter 100 includes torque converter clutch 128 with piston plate 130 rotationally connected to output hub 132 using any means known in the art, for example, spline 134. Clutch 128 includes plate 124. In some aspects, torque converter 100 includes damper assembly 136 rotationally connected to cover 104 by any means known in the art, for example, spline connection 137. Assembly 136 is connected to clutch 102 by any means known in the art, for example, plate 138, which forms a portion of clutch 102 and is rotationally connected to the damper assembly. In some aspects (not shown), torque converter 100 does not include a damper assembly and cover 104 is linked to the clutches with a plate or similar component. Then, clutches 102 or 128 may be slipped to attenuate torque spikes from an engine (not shown) for a vehicle (not shown) in which torque converter 100 is installed.

In the configuration shown, clutch 102 is closed when the torque converter is in torque converter mode (impeller 106 and turbine 140 multiply torque transmitted from cover 104) and both clutch 102 and clutch 128 are closed in lock-up mode (torque from the cover is transmitted through clutch 128 to hub 132). Advantageously, the impeller inertia can be used to affect the natural frequency of torque converter 100 during lock-up mode to tune out undesirable resonance.

Figure 9:
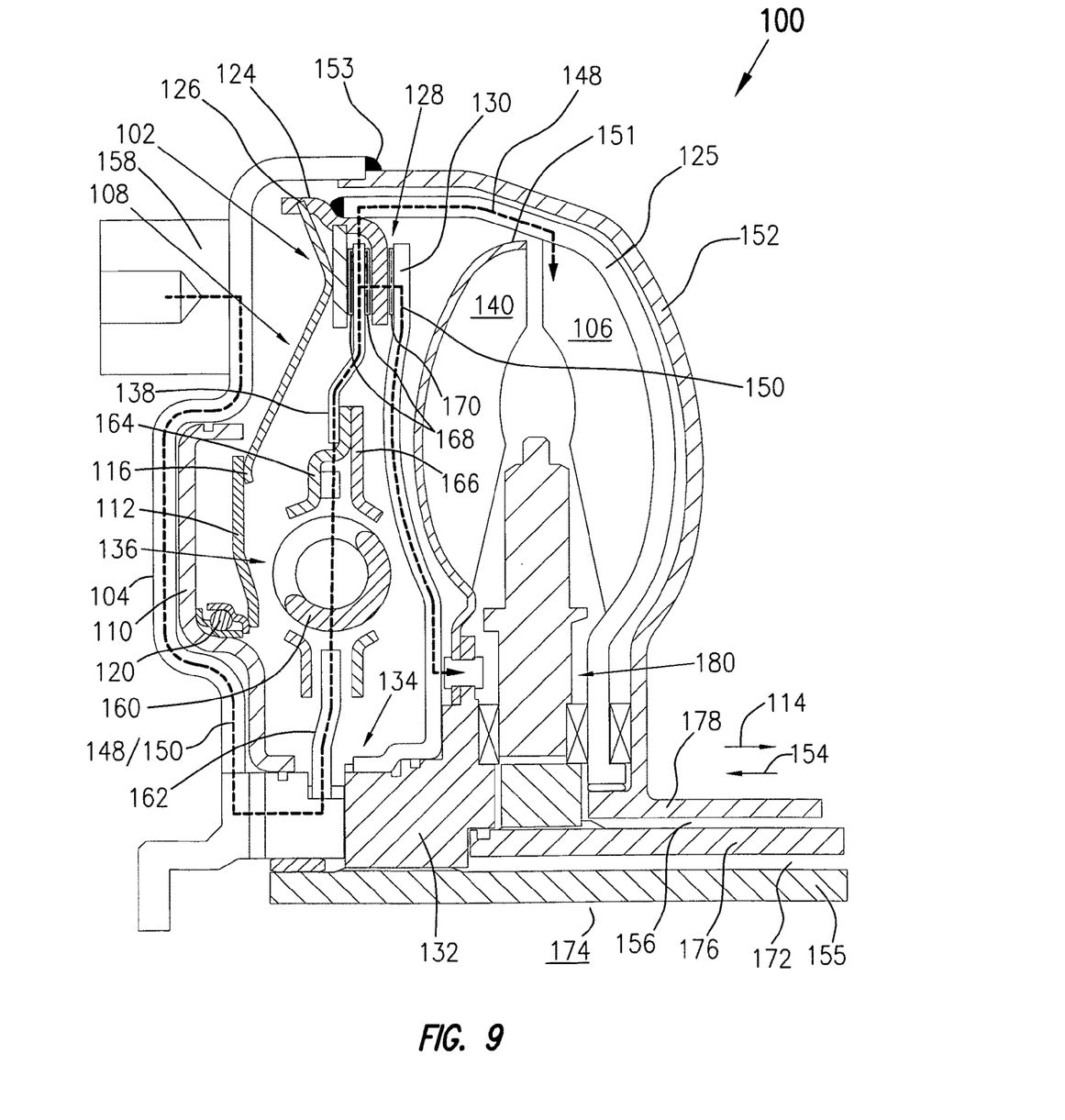
FIG. 9 is a partial cross-sectional view of the torque converter in FIG. 8 showing torque transmission paths.

FIG. 9 is a partial cross-sectional view of the torque converter in FIG. 8 showing torque transmission paths 148 and 150.

Figure 10:
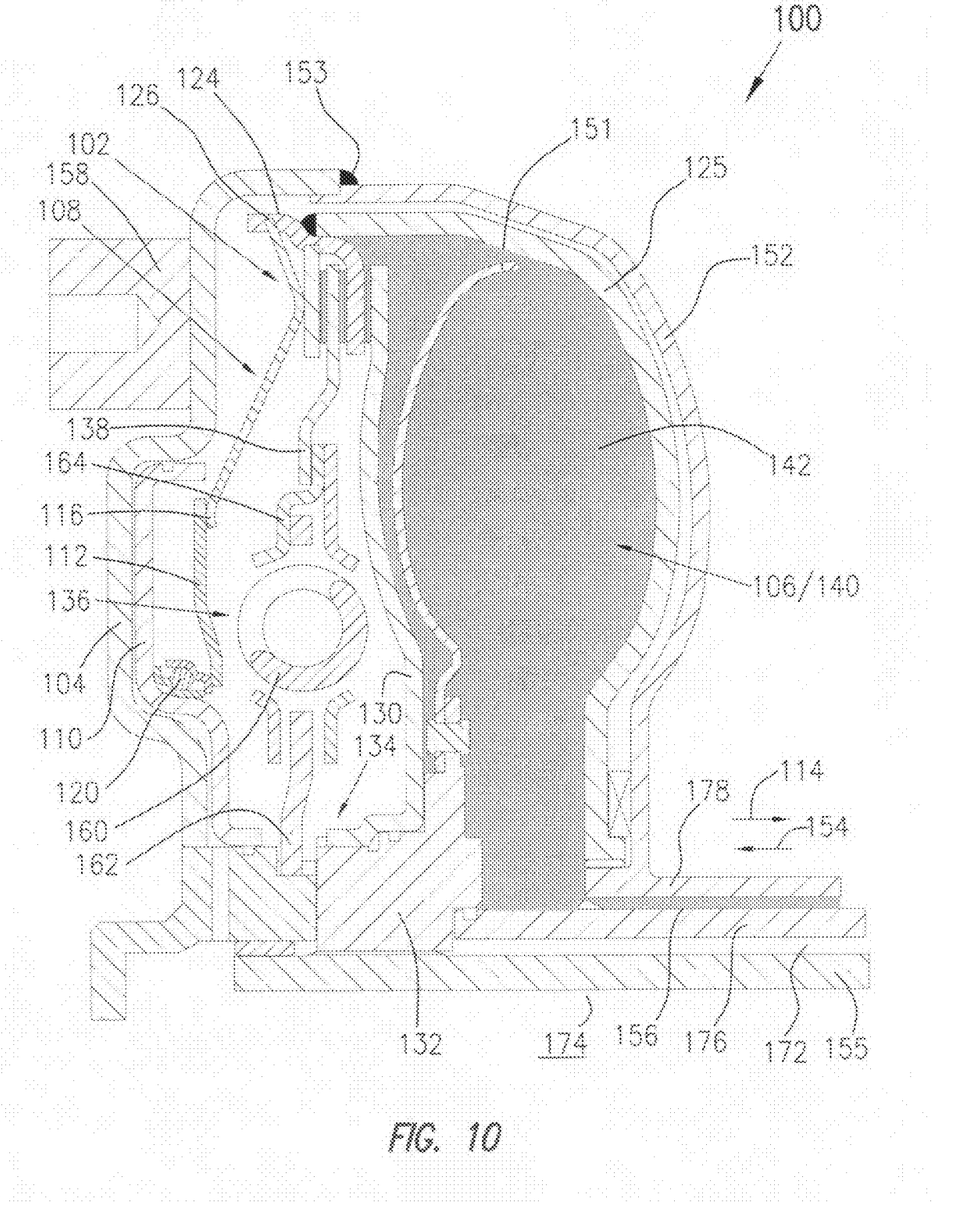
FIG. 10 is a partial cross-sectional view of the torque converter in FIG. 8 showing the impeller charge chamber.
Figure 11:
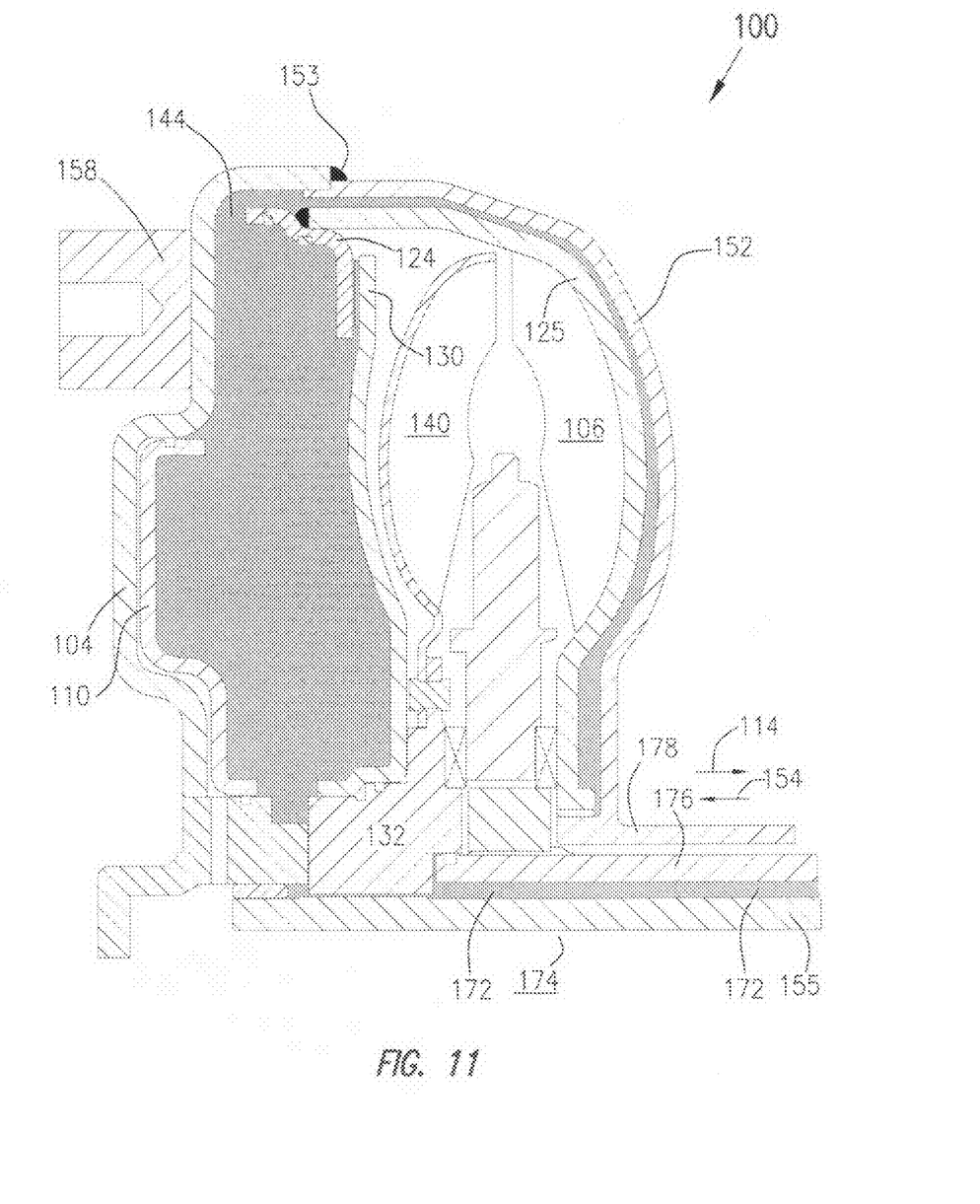
FIG. 11 is a partial cross-sectional view of the torque converter in FIG. 8 showing the inner chamber.
Figure 12:
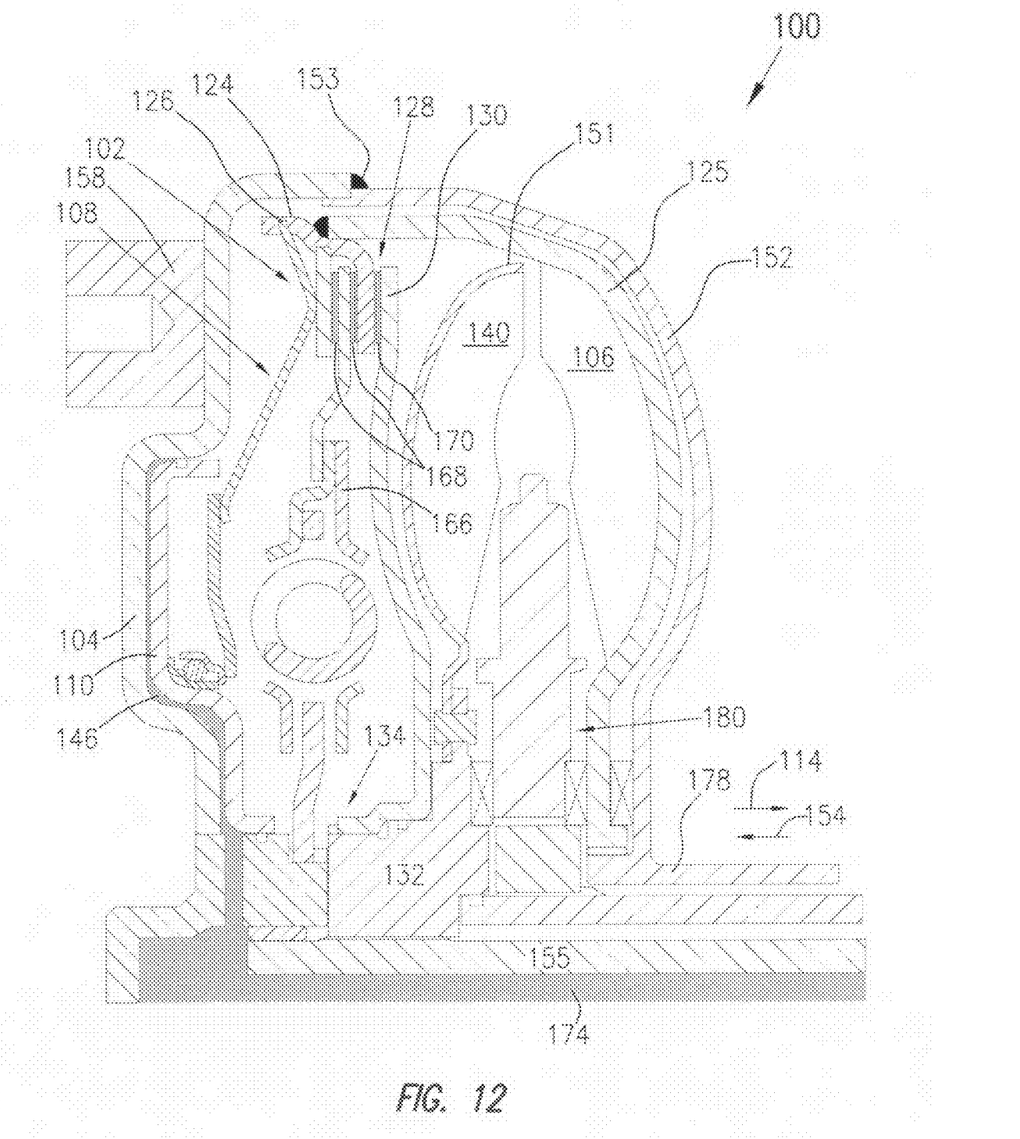
FIG. 12 is a partial cross-sectional view of the torque converter in FIG. 8 showing the outer chamber.

FIG. 10 is a partial cross-sectional view of the torque converter in FIG. 8 showing torus chamber 142;

FIG. 11 is a partial cross-sectional view of the torque converter in FIG. 8 showing inner chamber 144; and, FIG. 12 is a partial cross-sectional view of the torque converter in FIG. 8 showing outer chamber 146. The following should be viewed in light of FIGS. 8 through 12. Clutch 102 is located in a mechanical torque transmission path between cover 104 and impeller 106, through assembly 136. In some aspects, the path is path 148. Clutch 104 is located in a mechanical torque transmission path between cover 104 and hub 132, through assembly 136. In some aspects, the path is path 150. As described infra, manipulation of the respective hydraulic pressures in chambers 142, 144, and 146 causes the clutches to open and close, which subsequently opens, and closes the torque transmission paths. By opening a torque transmission path, we mean breaking or interrupting the path. That is, the path is not able to transmit torque along its full length. Alternately stated, the path is made discontinuous. For example, one end of the torque path may experience a torque, but the torque is not transmitted to the other end. By closing a torque transmission path, we mean making the path continuous so that the path is able to transmit torque along its full length.

Chamber 142 includes turbine 140 and impeller 106 and is at least partially defined by impeller shell 125 and plates 124 and 130. By partially defined, we mean that the shell and plates form at least part of the boundaries or containment of the chamber. Chamber 144 is at least partially defined by plates 130, 124, and 110, cover 104 and cover 152, which is connected to cover 104 by any means known in the art, for example, weld 153. Chamber 146, also referred to as the charge chamber for clutch 102, is at least partially defined by cover 104 and plate 110.

To operate torque converter 100 in an engine idle mode, that is, the engine is idling, both clutch 102 and clutch 128 are opened. To accomplish this, fluid in chamber 142 is maintained at a pressure less than pressure for fluid in chamber 144, axially displacing plate 130 in direction 114 and opening clutch 128. Pressure for fluid in chamber 144 is maintained at a level greater than pressure for fluid in chamber 146, axially displacing plates 110 and 112 in direction 154 and opening clutch 102. In this configuration, no torque is transmitted to hub 132, which, when converter 100 is installed in the vehicle, is rotationally connected to input shaft 155 for a transmission (not shown). Thus, the cover and the hub are able to rotate independent of each other and no engine torque is transmitted to the transmission.

Alternately stated, the hub, which is rotationally connected to the transmission, is rotationally disconnected from the portions of the torque converter receiving torque from the engine (cover 104) and rotation between cover 104 and the impeller is interrupted. Thus, the portions of the converter directly or indirectly connected to the engine are rotationally disconnected from the hub. Therefore, the load seen by the engine due to the connection of the engine to the torque converter is reduced, improving fuel economy for the engine.

To operate torque converter 100 in a torque converter mode, clutch 128 is opened and clutch 102 is closed. To accomplish this, fluid in chamber 144 is maintained at a pressure greater than fluid in chamber 142, axially displacing plate 130 in direction 114 and opening clutch 128. Fluid in chamber 146 is maintained at a pressure greater than fluid in chamber 144, axially displacing plates 110 and 112 in direction 114 and closing clutch 102. In this configuration, path 148 is closed, path 150 is opened, and torque is transmitted from cover 104 through assembly 136 to clutch 102 and on to impeller 106. That is, impeller 106 is rotationally connected to cover 104 and turbine 142 is energized by the impeller and rotates hub 132.

To overcome the problem described supra regarding hydraulic pressures in a clutch release chamber and in a torus, torque converter 100 uses the mechanical advantage afforded by assembly 108 to provide sufficient force to close clutch 102 while providing adequate hydraulic pressure in the torus. A certain amount of pressure is needed in chamber 142 to prevent cavitation in the torus. Since chambers 142 and 144 are in fluid communication, the pressure in chamber 144 is linked to the relatively high pressure in chamber 142. However, chamber 144 is the release chamber for clutch 102 and pressure in the chamber resists the movement of plate 110 to engage clutch 102. Therefore, the force on plate 110 in direction 114 must overcome the pressure in chamber 144 and provide the desired clamping force.

For example, in some aspects, the hydraulic pressure in chambers 142 and 144 (to prevent cavitation, open clutch 128, and flow fluid through the torus) is in the range of 60-75 psi. The pressure in chamber 146 is limited to approximately 100-120 psi. Thus a differential pressure of about 25-60 psi is available to engage clutch 102. This is a relatively low pressure for a clutch charge and would limit torque capacity of clutch 102. However, the pressure in chamber 146 is multiplied by assembly 108 to generate a larger clamping force on clutch 102, increasing the torque capacity of clutch 102.

During operation in torque converter mode, heat is generated by the turbine and impeller. To cool the torus, it is desirable to provide a flow of fluid through chamber 142 during torque converter mode to cool the turbine and impeller. In some aspects, fluid flows from chamber 144 to chamber 142 and on to channel 156. Thus, a same hydraulic operation and chamber are used to manipulate the clutches to enact the torque converter mode and to provide cooling flow to the torus. Clutch 102 includes friction material (described infra), and the cooling flow for the torus bypasses the friction material. By bypass we mean the fluid does not pass through the friction material, although the fluid may flow across an edge or boundary of the material.

To operate torque converter 100 in a lock-up mode, that is, connecting housing 104 to hub 132, clutch 128 is closed. As noted supra, clutch 102, which is closed in torque converter mode, remains closed in lock-up mode. Keeping clutch 102 closed introduces the inertia of the impeller to the torque transmission path. The impeller inertia can be used to affect the natural frequency of the torque converter during lock-up mode to tune out undesirable resonance.

To close clutch 128, fluid in chamber 142 is maintained at a pressure greater than pressure for fluid in 144, axially displacing plate 130 in direction 154. In this configuration, path 150 is closed and torque is transmitted from cover 104 to assembly 136 and hub 132. That is, cover 104 is rotationally connected to hub 132.

It should be understood that the pressures referenced supra are relative and are not restricted to any particular value or range except for the values or ranges inherent in the overall design, configuration, and operation of a particular torque converter 100.

Cover 104 can be connected to the engine by any means known in the art. In some aspects, lugs 158 are used. In some aspects, assembly 136 includes a plurality of coil springs 160 mounted on flange 162 and cover plates 164 and 166.

Friction material 168 is axially disposed between plates 122, 124, and 138. Clutch 102 is not limited to any particular type or configuration of friction materials. In some aspects, friction material is fixedly secured to the plates. In some aspects (not shown), one or more clutch plates are axially disposed between the plates. Friction material 170 is axially disposed between plates 124 and 130. Clutch 128 is not limited to any particular type or configuration of friction materials. In some aspects, friction materials are fixedly secured to the plates. In some aspects (not shown), a clutch plate is axially disposed between the plates.

In some aspects, converter 100 includes a three-pass hydraulic system. In this system channels 156, 172 and 174 transport fluid to and from chambers 142, 144, and 146, respectively. Channel 156 is disposed radially between stator shaft 176 and flange, or pump hub, 178 and is in fluid communication with chamber 142. Channel 172 is disposed radially between input shaft 155 and stator shaft 176 and is in fluid communication with chamber 144. Channel 174 is located inside shaft 155 and is in fluid communication with chamber 146.

A present invention torque converter, for example, torque converter 100, presents a reduced load during engine idle. By presenting a reduced load, we mean that during an idle mode for the engine, the torque converter reduces the load seen by the engine from the torque converter.

Clutches 102 and 128, plates 110 and 112, lever element 108, and damper assembly 136 are shown with specific shapes, sizes, and configurations. However, it should be understood a present invention torque converter is not limited to the shapes, sizes, and configurations shown and that other shapes, sizes, and configurations in accordance with the descriptions supra are included within the spirit and scope of the claims. Torque converter 100 has been shown with a specific configuration of ancillary components, for example, stator one-way clutch 180. However, it should be understood that a present invention torque converter is not limited to the specific ancillary parts and configuration of ancillary parts shown in the figures, and that other ancillary parts and configurations are included in the spirit and scope of the claimed invention.

Although a present invention torque converter has been shown with an impeller clutch engaged with a lever element, it should be understood that a present invention torque converter is not limited to only an impeller clutch. In some aspects, a present invention torque converter includes a clutch rotationally connected to two torque transmitting elements, such as a cover, a turbine, or an output hub. A lever element, similar to lever element 108 in FIG. 8, is in contact with the clutch and displaceable to multiply a force applied to the lever element and to transmit the multiplied force to the clutch. The torque converter also includes a piston plate, similar to plate 110 in FIG. 8, axially engaged with one end of the lever element and axially displaceable to apply the force to the lever element. The torque converter includes an axially fixed plate, similar to plate 124 in FIG. 8, and the other end of the lever element is pivotably attached to the fixed plate.

The present invention also broadly comprises a method of operating a torque converter including the steps of maintaining pressure for fluid in a second chamber greater than pressure for fluid in a first chamber, the first chamber including a torus; multiplying a clutch apply force using mechanical advantage associated with a lever; maintaining pressure for fluid in a third chamber greater than the pressure for fluid in the second chamber; closing, in response to multiplying the clutch apply force and maintaining pressure for fluid in a third chamber greater than the pressure for fluid in the second chamber, a torque transmission path between the cover and an impeller; and flowing the fluid from the second chamber to the first chamber to cool the torus. In some aspects, the method includes opening, in response to maintaining pressure for fluid in a second chamber greater than pressure for fluid in a first chamber, a mechanical torque transmission path between a cover for the torque converter and an output hub. The torque path between the cover and the impeller includes friction material and the method bypasses the friction material with the flow between the second and first chambers. In some aspects, the torque converter is converter 100.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A torque converter comprising:
   a turbine;
   an impeller;
   a stator one-way clutch at least partially axially disposed between the turbine and the impeller;
   an impeller clutch with an impeller plate, a fixed plate, a first portion connected to a cover for the torque converter, and a second portion connected to the impeller; and,
   a lever element in contact with said impeller clutch and displaceable to multiply a first force applied to said lever element for operation of said impeller clutch, wherein said impeller plate is axially displaceable, said fixed plate is fixed to said impeller, one end of said lever element is pivotably connected to said fixed plate, and said lever element is in contact with said impeller plate.

2. The torque converter of claim 1 further comprising an impeller piston plate axially engaged with said lever element and displaceable to generate said first force.

3. The torque converter of claim 2 further comprising an apply plate engaged with said impeller piston plate and connected to said lever element.

4. The torque converter of claim 2 wherein said impeller piston plate and said lever element are independently rotatable.

5. The torque converter of claim 2 wherein said impeller piston plate is rotationally connected to said cover and said lever element is rotationally connected to said impeller.

6. The torque converter of claim 1 wherein said impeller plate is arranged to close said impeller clutch in response to said displacement of said lever element.

7. The torque converter of claim 1 further comprising an output hub and a torque converter clutch, said torque converter clutch comprising said fixed plate and a piston plate connected to said output hub.

8. The torque converter of claim 1 further comprising a damper assembly rotationally connected to said cover and to said impeller clutch.

9. The torque converter of claim 1 further comprising a torus, wherein a second force is associated with a hydraulic pressure to prevent cavitation in said torus, a third force is required to operate said impeller clutch to transmit a desired torque across said impeller clutch, and said multiplied force is at least equal to a sum of said second force and third forces.

10. A torque converter comprising:
    a damper assembly rotationally connected to a cover for the torque converter;
    an impeller clutch with a first portion connected to said damper assembly and with a second portion connected to an impeller, said second portion comprising an axially displaceable plate and a plate fixed to the impeller;
    a piston plate; and,
    a lever element pivotably connected to said fixed plate and axially engaged with said piston plate and said axially displaceable plate, wherein said lever element is displaceable to multiply a force applied to said piston plate and to transmit said multiplied force to said axially displaceable plate.

11. A method of operating a torque converter comprising the steps of:
    maintaining pressure for fluid in a second chamber greater than pressure for fluid in a first chamber, said first chamber including a torus;
    multiplying a clutch apply force using mechanical advantage associated with a lever;
    maintaining pressure for fluid in a third chamber greater than said pressure for fluid in said second chamber;
    closing, in response to multiplying said clutch apply force and maintaining pressure for fluid in a third chamber greater than said pressure for fluid in said second chamber, a torque transmission path between said cover and an impeller; and,
    flowing said fluid from said second chamber to said first chamber to cool said torus.

12. The method of claim 11 further comprising opening, in response to maintaining pressure for fluid in a second chamber greater than pressure for fluid in a first chamber, a mechanical torque transmission path between a cover for said torque converter and an output hub.

13. The method of claim 11 wherein said torque path between said cover and said impeller includes friction material and said method further comprising bypassing said friction material with said flow between said second and first chambers.

14. A torque converter comprising:
    a turbine;
    an impeller;
    a stator one-way clutch at least partially axially disposed between the turbine and the impeller;
    an impeller clutch with a first portion connected to a cover for the torque converter and a second portion connected to the impeller;
    a torus; and,
    a lever element in contact with said impeller clutch and displaceable to multiply a first force applied to said lever element for operation of said impeller clutch, wherein a second force is associated with a hydraulic pressure to prevent cavitation in said torus, a third force is required to operate said impeller clutch to transmit a desired torque across said impeller clutch, and said multiplied force is at least equal to a sum of said second force and third forces.

15. A torque converter comprising:
    a turbine;
    an impeller;
    a stator one-way clutch at least partially axially disposed between the turbine and the impeller;
    an impeller clutch with a first portion connected to a cover for the torque converter and a second portion connected to the impeller;
    a lever element in contact with said impeller clutch and displaceable to multiply a first force applied to said lever element for operation of said impeller clutch; and,
    an impeller piston plate axially engaged with said lever element and displaceable to generate said first force, wherein said impeller piston plate and said lever element are independently rotatable.

* * * * *